(12) United States Patent
Hillary et al.

(10) Patent No.: US 7,865,510 B2
(45) Date of Patent: Jan. 4, 2011

(54) INTERNET USER-ACCESSIBLE DATABASE

(75) Inventors: Robin Hillary, Temecula, CA (US); Michelle McCarthy, Temecula, CA (US); Louis Rodriguez, Santa Monica, CA (US)

(73) Assignee: LitCentral, Inc, Temecula, CA (US)

( * ) Notice: Subject to any disclaimer, the term of this patent is extended or adjusted under 35 U.S.C. 154(b) by 227 days.

(21) Appl. No.: 11/827,917

(22) Filed: Jul. 12, 2007

(65) Prior Publication Data
US 2008/0016044 A1  Jan. 17, 2008

Related U.S. Application Data

(60) Provisional application No. 60/830,561, filed on Jul. 12, 2006.

(51) Int. Cl.
*G06F 17/30* (2006.01)
(52) U.S. Cl. .......... 707/752; 707/728; 715/201
(58) Field of Classification Search .......... 707/640, 707/706, 608, 727, 728, 748, 752; 715/201, 715/209; 704/7, 9; 705/27
See application file for complete search history.

(56) References Cited

U.S. PATENT DOCUMENTS

| | | | | |
|---|---|---|---|---|
| 5,379,423 A | * | 1/1995 | Mutoh et al. | 707/640 |
| 5,623,679 A | * | 4/1997 | Rivette et al. | 715/255 |
| 5,630,125 A | * | 5/1997 | Zellweger | 707/103 R |
| 5,829,002 A | * | 10/1998 | Priest | 707/10 |
| 5,862,325 A | * | 1/1999 | Reed et al. | 709/201 |
| 6,029,174 A | * | 2/2000 | Sprenger et al. | 707/103 R |
| 6,275,789 B1 | * | 8/2001 | Moser et al. | 704/7 |
| 6,434,568 B1 | * | 8/2002 | Bowman-Amuah | 709/203 |
| 6,442,748 B1 | * | 8/2002 | Bowman-Amuah | 717/108 |
| 6,601,026 B2 | * | 7/2003 | Appelt et al. | 704/9 |
| 6,671,818 B1 | * | 12/2003 | Mikurak | 714/4 |
| 6,721,729 B2 | * | 4/2004 | Nguyen et al. | 707/706 |
| 6,978,046 B2 | * | 12/2005 | Robinson et al. | 382/209 |
| 7,013,290 B2 | * | 3/2006 | Ananian | 705/27 |
| 7,076,736 B2 | * | 7/2006 | Hugh | 715/743 |
| 7,089,237 B2 | * | 8/2006 | Turnbull et al. | 707/5 |

(Continued)

FOREIGN PATENT DOCUMENTS

WO    WO 02059735 A1 *  8/2002

OTHER PUBLICATIONS

Ashu Guru, Paul Savory, Robert Williams, Web-based simulation management: a web-based interface for storing and executing simulation models, 2000, WSC '00: Proceedings of the 32nd conference on Winter simulation, retrieved from ACM digital library.*

*Primary Examiner*—Shahid A Alam

(57) ABSTRACT

A script management and asset development system is disclosed. The system includes user activated menus for facilitating the distribution, viewing, listening, analyzing, storage, archiving, retrieving, searching, sorting, annotating, prioritizing, quantifying, tracking, printing and managing of assets. Each asset can include one or more of a document, image, literary piece, script, manuscript, treatment, book, synopsis, logline, song. Assignable Asset Restriction Levels within the system facilitate the imposition of restrictions, limitations, and permissions to both users and assets. A Rubric is assignable to each asset. The Rubric includes elements to which a user can respond for each asset thereby producing a numeric value. Also, a numeric value grading system, which implements a running calculation of an RPA (Rubric Point Average) to provide a grade or rank to each asset, is provided based upon scoring of the elements on the Rubric.

2 Claims, 21 Drawing Sheets

U.S. PATENT DOCUMENTS

| | | | |
|---|---|---|---|
| 7,277,928 B2 * | 10/2007 | Lennon | 709/219 |
| 7,698,316 B2 * | 4/2010 | Song et al. | 707/608 |
| 2002/0023086 A1 * | 2/2002 | Ponzio, Jr. | 707/5 |
| 2002/0152267 A1 * | 10/2002 | Lennon | 709/203 |
| 2005/0262057 A1 * | 11/2005 | Lesh et al. | 707/3 |

* cited by examiner

FIG. 1
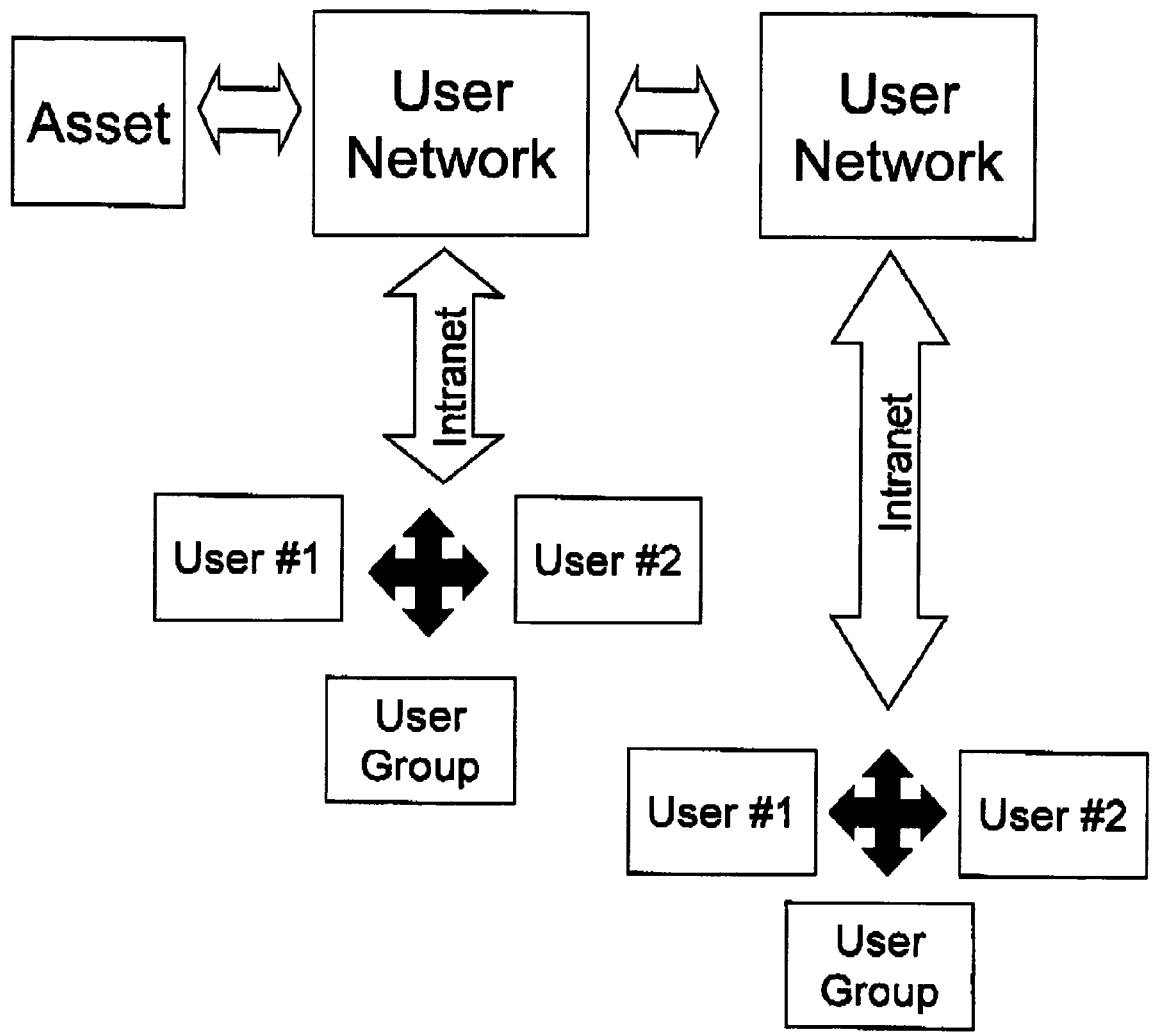
 = Collaboration of Asset
 = Asset Flow

FIG. 4
LitCentral
File    Edit    View    Window    Help
      
MyQueue  Messages  MyAssets  Notes  Reports  Contacts  Invites
My Scripts
| Asset Name | Type | Draft | Created |
|---|---|---|---|
| Stock Pile | Treatment | 3 | 6/01/2006 4:13PM |
| Big Waste of Space | Logline | 1 | 6/09/2006 2:34PM |
| Tic Tic | Script | 4 | 6/17/2006 3:20PM |
| Pride of Detroit | Script | 1 | 7/19/2006 5:17AM |
| Punk Rocker Diaries | Treatment | 1 | 8/01/2006 4:25PM |

FIG. 5

LitCentral

| File | Edit | View | Window | Help |

| MyQueue | Messages | MyAssets | Notes | Reports | Contacts | Invites |

Start Coverage Report

Script: [ ▼ ]

Coverage Type: [ ▼ ]

Note: [          ]

[ Create ]

FIG. 6A
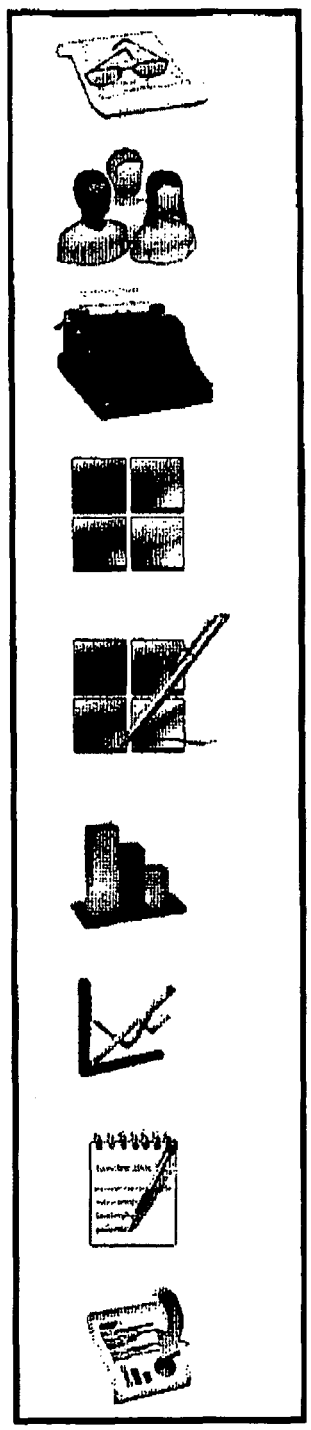
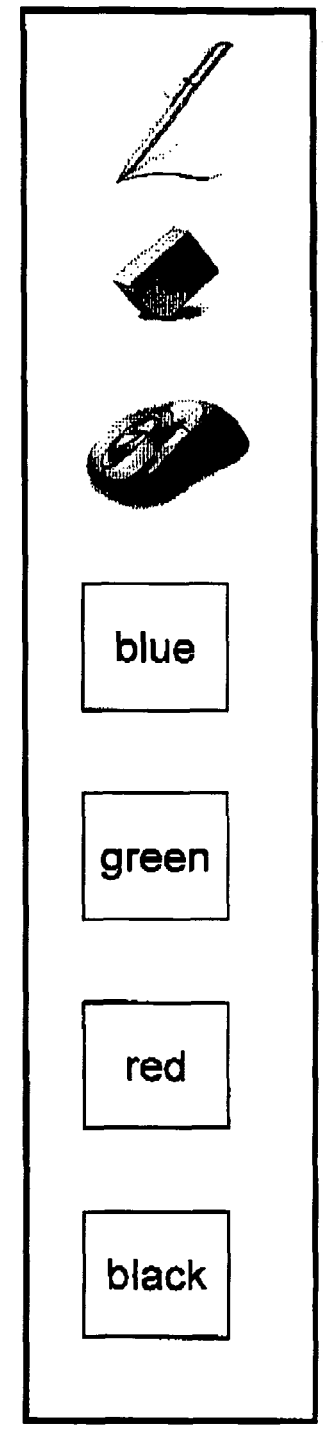

Chuckled

Laughed

LOL!

Great

Curious/Engaging

Intense!

Surprised

Tear-jerker

Eliminate

Out of Character

Tight

FIG. 7

File  Edit  View  Window  Help

MyQueue  Messages  MyAssets  Notes  Reports  Contacts  Invites

Cover Sheet

Title:
Draft:
Based On:
Purpose:
Elements Attached:
Submitted by:
Submitted to:
Prepared by:

Setting:
Locale:
Time Period:
Budget:
Genre 1:
Genre 2:
Pages:
Form:
Date:

Writer(s)

Logline:

Script Eval:
Reason:
Writer Eval:
Reason:

FIG. 8

| Tags | Coverage Rubric |
|------|-----------------|
| Navigation<br>Cover sheet<br>Characters<br>Synopsis<br>Rubric<br>Rubric Comments<br>Script Graph<br>Meter Graph<br>Note Report<br>Export Report | 1. Premise<br><br>Is the premise high-concept or engaging?<br><br>[Text] [Text] [Text] [Text]<br><br>Comments:<br><br>The writer could build up the premise over the first few pages in more detail.<br><br>2. Inciting Incident<br><br>Does the inciting incident grab your attention and occur in a timely manner?<br><br>[Text] [Text] [Text] [Text] |

FIG. 9

Rubric Comments

1. Premise - 1  The premise is not high-concept nor is it engaging.

*Note: Premise needs work!*

2. Inciting Incident - 4   The Inciting Incident immediately grabbed and held my attention

*Note: Excellent! This really drew me into the story.*

3. Introduction of Protagonist(s) - 3  The protagonist is somewhat intriguing and the reader can empathize with and root for certain elements.

*Note: You need to expand on the issues that confront the protagonist.*

Character Breakdown

DETROIT KING - (40s/M) black high-tech thief with a commanding presence. He is Use to order and being in control.

BUDDY - (60s/M) mental patient and a natural father figure. He completely obsessed with the game of baseball.

JESUS - (30s/M) black mental patient who thinks he's really Jesus Christ. Call him what you want, just don't touch him.

WACHOWSKI - (20S/M) mental patient who has along family history of depression and suicide.

BERKLEY - (30s/M) low-key unmotivated mental patient but don't mistake his flamboyancy for as a pushover. He has a dark criminally insane history.

FIG. 13

| Tags | Synopsis |
|---|---|
| Navigation | ← → ✂ 📄 📄 B ≔ ≡ |
| 👓 Cover sheet | DETROIT KING is a charismatic leader of a ruthless gang of thieves. He has decided to retire from the streets. Our hero meets JULIA, a bank teller during his last and final heist. These kindred spirits soon find out that they have a lot more in common. It's not long before Detroit grows restless in his retirement and he and Julia become the next Bonnie and Clyde of the South. |
| 👥 Characters | |
| 📇 Synopsis | |
| ▦ Rubric | |
| ▦ Rubric Comments | Script |
| 📊 Script Graph | Detroit (VO)<br><br>If a male lion is dethroned<br>And does not attach himself<br>To a new pride, he well starve<br>To death.<br><br>Ext. Ellis Street Alley - Downtown - Day |
| 📈 Meter Graph | |
| 📝 Note Report | |
| 📄 Export Report | |

FIG. 14

Tag & Notes Report

(Page 5)

Detroit (VO)

Great     If a male lion is dethroned and does not attach himself to a new pride, he will starve to death in the wild. This is the story of how I Got my pride back.

*Note: This narration works well and give us further insight into Detroit's character.*

FIG. 15

Tag & Notes Report

(Page 5)

Detroit (VO)

Great    If a male lion is dethroned and does not attach himself to a new pride, he will starve to death in the wild. This is the story of how I Got my pride back.

*Note: This narration works well and give us further insight into Detroit's character.*

FIG. 17

Check "Full Coverage" to produce a report with all options exported.

☑ Full Coverage

Or choose from the checkbox options below to produce a report with fewer options.

☐ Cover Sheet
☐ Character Breakdown
☐ Synopsis
☐ Graphs/ Meters
☐ Rubric Comments
☐ Tag Reports
☐ Note Report Save

FIG. 18

Asset Restriction Levels (ARL)

Low
- Distribute asset throughout User network
- Distribute asset outside of User network
- Print asset with or without watermark
- Save asset Medium
- Distribute asset only throughout User network
- Print asset with or without watermark
- Save or no saving High
- Asset intended solely for recipient's review and can travel no further than recipient's inbox.
- No printing
- No saving

FIG. 19

RPA Score ☐

| Element | 1 | 2 | 3 | 4 |
|---|---|---|---|---|
| 1. The title... | ...is cliché  ...isn't relevant | ...is applicable, but no frill  ...is somewhat relevant | ...is original  ...is appropriate | ...is fresh and compelling  ...is completely relevant |

Add comment:

| | 1 | 2 | 3 | 4 |
|---|---|---|---|---|
| 2. The premise.. | ...is unclear/ lacks direction  ...was not credible | ...is clear, but deviates from concept  ...is somewhat credible | ...is clear and consistent  ...is credible and solid | ...is high concept/ and worldly  ...is authentic And genuine |

Add comment:

| | 1 | 2 | 3 | 4 |
|---|---|---|---|---|
| 3. The inciting incident... | ... Is non-existent  ...is not organic to the story | ...is somewhat Interesting  ...is organic to The story, but out of sequence | ...is interesting/  ...is organic and out of sequence, but still works | ...is enticing and draws reader in  ...grabs and holds reader's attention |

Add comment:

continued 

INTERNET USER-ACCESSIBLE DATABASE

CROSS-REFERENCE TO RELATED APPLICATIONS

This application claims the benefit of U.S. Provisional Application No. 60/830,561, filed Jul. 12, 2006, the entire contents of which are hereby incorporated by reference.

BACKGROUND OF THE INVENTION

1. Field of the Invention

The present invention relates generally to the workflow of a software database universal script management and asset (document, image, literary piece, script, manuscript, treatment, book, synopsis, logline, song) development system which is both web- and desktop-based—where assets are to be distributed, viewed, heard, analyzed, stored, archived, retrieved, searched, sorted, annotated, prioritized, quantified, ranked, graded, tracked, printed and managed within a single User's Network or between Users' Networks. The software system is adapted to generate graphical and text images for providing a User interface between an asset and a User. The software uses a computer system the internet, intranet, or other network system to give Users access to the assets, notes, graphs, analyzing tools and output.

2. Description of Related Art

Document management systems have existed for managing various types of documents. Computer systems have existed for generating and maintaining databases containing documents, pages, and other items. One popular computer-system implemented database comprises a registry system in which a number of specific merchandise items are listed for a given party, and a user can select from the list of specific merchandise items. U.S. Pat. No. 5,469,206 to Strubb et al. discloses an electronic catalog which is updated at predetermined intervals. A user of the electronic catalog can enter data to facilitate the user's viewing of only particular, predetermined portions of an electronic catalog, according to the user's instructions. Another prior-art reference, U.S. Pat. No. 4,799,156 to Shavit et al., discloses a system for interactive on-line electronic communications and processing of business transactions between a plurality of different types of independent Users.

SUMMARY OF THE INVENTION

The software of the present invention is adapted to distribute, view, hear, analyze, store, archive, retrieve, search, sort, annotate, prioritize, quantify, grade, rank, track, print, save and manage assets (document, image, literary piece, script, manuscript, treatment, book, synopsis, logline, song) using Asset Restriction Levels for security.

The software is built for various operating systems such as but not limited to Mac OSX, Windows XP, Vista, and Windows XP Tablet Edition. The software is maintained on servers, with each User's assets being stored in the User's Network within the database. There are various editions of the software which include (but are not limited to) the entertainment industry, publishing industry, film, television, etc.

Assets and any related "workflow" (e.g., reports, notes, etc.) are given tracking identification numbers which secure and track all copies of information everywhere they are stored and used (e.g., tracking identification numbers for related workflow correspond to asset).

Some analyzing tools (i.e. Rubric, Tags, etc.) can be customized by the User, depending upon edition of software.

Data, reports, and workflow regarding assets are displayed in text, graph and/or image format.

The software is both web- and desktop-based whereby the desktop will "ping" the web for updates which occur in "real time."

The software is a subscription-based service with a monthly subscription. Billing for the software is accepted via credit cards, Paypal or other electronic means.

While the software and method have or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

Any feature or combination of features described herein are included within the scope of the present invention provided that the features included in any such combination are not mutually inconsistent as will be apparent from the context, this specification, and the knowledge of one skilled in the art. In addition, any feature or combination of features may be specifically excluded from any embodiment of the present invention. For purposes of summarizing the present invention, certain aspects, advantages and novel features of the present invention are described. Of course, it is to be understood that not necessarily all such aspects, advantages or features will be embodied in any particular implementation of the present invention. Additional advantages and aspects of the present invention are apparent in the following detailed description and claims that follow.

BRIEF DESCRIPTION OF THE DRAWINGS

FIG. 1A illustrates a diagram of an overview of how an asset can travel from one User's network to another or within a User's own network;

FIG. 4 illustrates the top toolbar menu/features once a menu/feature is selected by User.

FIG. 5 illustrates the Start Coverage (or begin analysis) function;

FIG. 7 illustrates the floating Tag/Navigation panel (tags);

FIG. 8 illustrates the Rubric;

FIG. 9 illustrates the Rubric Comments;

FIG. 12 illustrates the Characters;

FIG. 13 illustrates the Synopsis;

FIG. 14 illustrates the Tag Report;

FIG. 15 illustrates the Note Report;

FIG. 17 illustrates the Export Report;

FIG. 18 provides an outline of various Asset Restriction Levels; and

FIG. 19 illustrates an Element of story structure, with Question and Declarative Statements.

DETAILED DESCRIPTION OF THE INVENTION

Figure 2:
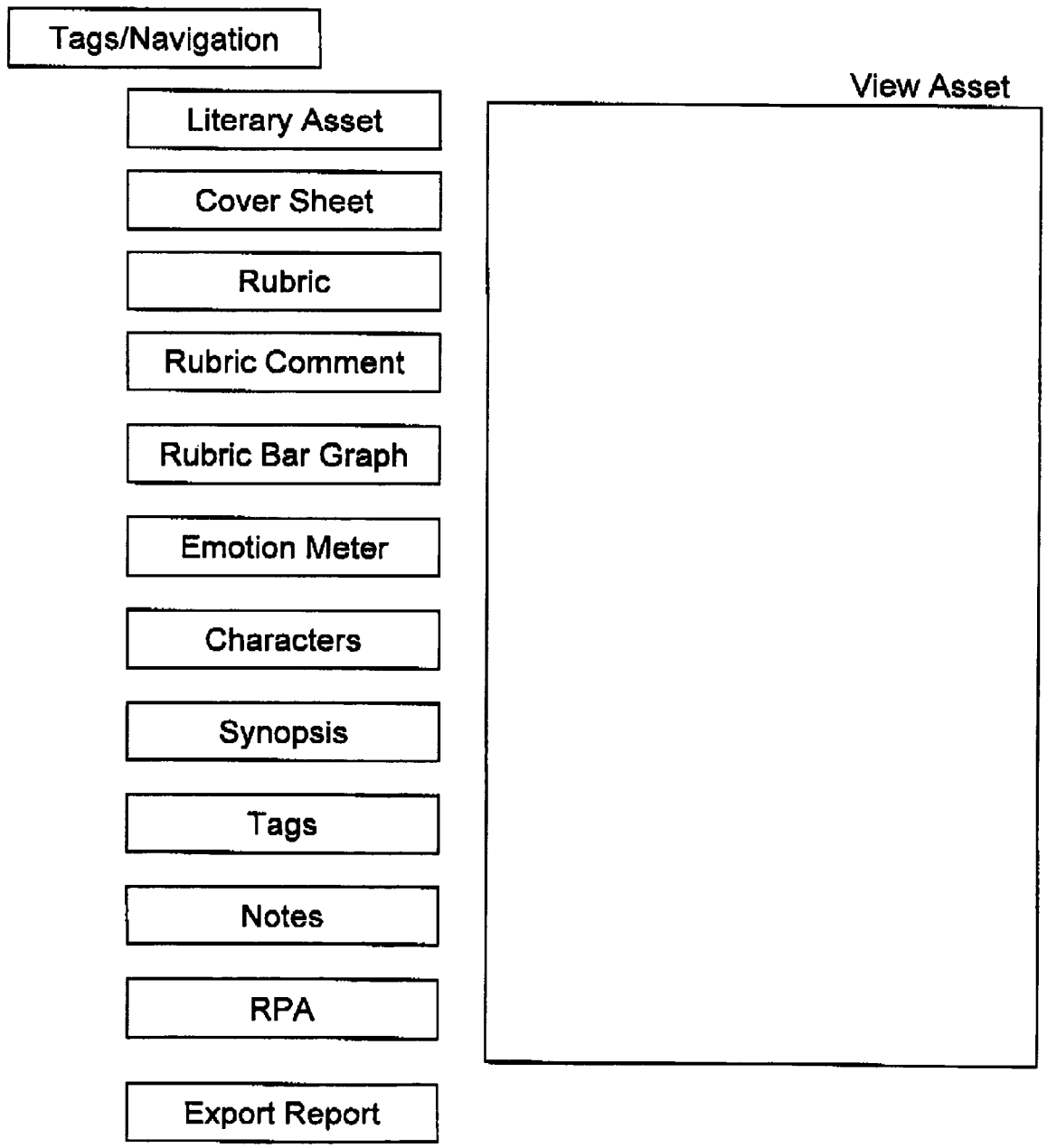
FIG. 2 is a flow chart illustrating the method of analyzing an asset.

Reference will now be made in detail to the presently preferred embodiments of the invention, examples of which are illustrated in the accompanying drawings. Wherever possible, the same or similar reference numbers are used in the drawings and the description to refer to the same or like parts. It should be noted that the drawings are in simplified form and are not to precise scale. In reference to the disclosure herein, for purposes of convenience and clarity only, directional terms, such as, top, bottom, left, right, up, down, over, above, below, beneath, rear, and front, are used with respect to the accompanying drawings. Such directional terms should not be construed to limit the scope of the invention in any manner.

Although the disclosure herein refers to certain illustrated embodiments, it is to be understood that these embodiments are presented by way of example and not by way of limitation. The intent of this disclosure, while discussing exemplary embodiments, is that the following detailed description be construed to cover all modifications, alternatives, and equivalents of the embodiments as may fall within the spirit and scope of the invention as defined by the appended claims. It is to be understood and appreciated that the process steps and structures described herein do not cover a complete process flows. The present invention may be practiced in conjunction with various techniques that are conventionally used in the art, and only so much of the commonly practiced process steps are included herein as are necessary to provide an understanding of the present invention.

It is understood that all functions performed within the software are stored in the software database. This software is both web- and desktop-based with the desktop "pinging" the web every few minutes with updates occurring in "real time." There are certain Asset Restriction Levels (ARLs) within the software that allow for restrictions, limitations, and permissions to both Users and assets. Various elements and or functions within the database may be customized (depends upon the edition of the software).

As used herein, an "asset" or "literary asset" can comprise one or more of a document, image, literary piece, script, manuscript, treatment, book, synopsis, logline, song. For example, a document may comprise a screenplay, script, or manuscript. Typically, an asset will relate to one or more of a play, a broadcast, a piece of music, a movie, a view, a game and a book.

As used herein, a "User" can also be defined as a Reader, Reviewer, Industry Professional, Subscriber, or anyone who has subscribed to the present invention or has been given access to the invention by a Subscriber.

The term "User's Network" can be applied to an individual User, or a group of Users within the same company. The database offers a secure User Network for accessing assets. A User has the option to use an in-house server or to use the database server. Each User (or User's company) has its own secure "User Network" within the database.

The present invention is adapted to generate graphical and text images for providing a User interface between a User and a computer system, providing access to and from an internet, intranet, or other network system.

Levels of permission (Asset Restriction Levels) can be specified (e.g., selected from predefined values) by Users for who can access a literary asset (i.e. Writer, Reader, Producer, etc.) and to what extent (i.e. permission levels of Low, Medium, High), and can also be attached to specific workflow, communication, notes, etc. associated with a literary asset. This helps to prevent literary assets and all related workflow from being printed, forwarded, or copied by unauthorized individuals.

The present invention can be implemented on a variety of devices such as personal computers, mobile devices, and ultra-mobile devices, and can be interfaced using a mouse, keyboard, keypad, digitizer, touch screen, portable readers, E-book readers, and/or voice command.

The present invention allows Users to collaborate and communicate on an asset using notes, comments, internal email, instant messaging, etc. within the database. The present invention includes the ability for Users to store contact information and maintain personal address books. The invention also allows for inter- and intra-Network message communication and internal email. For example, Users can send internal emails and or instant messages from one User of the software to another User of the software internally within the software database.

The present invention provides the ability to link to the software database RSS feeds, news headlines, blogs, and other such web sites either directly to the database or to a User's Network.

The present invention provides the ability for individual Users and or User(s) Networks to link to external reports, reporting services and databases, such as but not limited to the Star Power Report (a report consisting of a subjective ranking of 1,000+ actors) and the IMDB (Internet Movie Database, which is an online database about movie stars, movies, televisions shows, commercials and video games). For example, if a User is trying to find talent for a screenplay, the User can access IMDB (from within the software database) and find information on the talent they are interested in researching. As presently embodied, ARLs do not apply as this feature is available to all Users.

Editing, key-sequencing features (e.g., using the Ctrl key on a keyboard with another key as a shortcut, such as Ctrl+C=copy), spell check features, and other customary, conventional features are available in all text/annotation areas of the software. Asset pages are displayed with page numbers, line breaks, go to page, find (similar to Microsoft Word), and a running calculation of the RPA (Rubric Point Average).

RPA (Rubric Point Average) is the value (e.g., grade, score, or rank) given to an asset once a User has completed the review/analysis of an asset using the Rubric within the software database. To calculate an RPA a User would complete the Rubric by choosing one answer (e.g., written as a declarative statement) to each element question in the Rubric. RPAs are displayed in X.X format, range from 0.0 to 4.0, and are calculated by dividing the total number of elements (e.g., 25) by the value (i.e., numerical score) each element receives (e.g., 0-4) by the User reviewing the asset.

The present invention allows Users to color-code their comments/notes. For example, when many Users are collaborating on an asset there can be notes and comments from each User. The ability to color-code the comments (e.g., a different primary color for each User) allows for easy identification of each User's comments/notes. For example, if 5 Users are collaborating on an asset, comments/notes may be in 5 different colors. Users can also choose which comments/notes they want visible when collaborating on an asset. Therefore the ability to "switch-on/switch-off" a User's comments/notes is also available. For example, if 5 people are collaborating on an asset, and a User only wants the opinions of 4 of the Users, a User can choose to eliminate the comments/notes of another User by choosing an option such as "turn comments/notes for User X off."

Currently screenplays and manuscripts are predominately written using a formatting software (i.e. Final Draft, Movie Magic, Scriptware). After the screenplay or manuscript is written, it is prepared for review/analysis in one of two ways—printed, bound and snail-mailed (the majority) or converted to PDF (the minority) and sent via the internet, to a specific recipient. The current paperbound method was sufficient when writers used typewriters as their means of creating. A writer's productivity was at such a level that the current method of handling and analyzing literary assets sufficed. However with the new technological advances (i.e. formatting software, personal computers, internet, online contests, etc.) the production level of writers, as well as the number of writers, has quadrupled. There are more writers vying for screenwriting careers, and the internet has opened a new portal to both industries. This has caused a backlog or bottleneck in the industries as the way for accepting these literary assets (e.g., script management) has not changed along with technology. The method of reviewing literary assets (e.g., script development) is also flawed as there is a loose standard, varying from entity to entity.

The present invention's script management and development system targets, and is primarily intended for, the entities (i.e. publishing houses, agencies, production companies, screenplay contests, studios, etc.) that accept literary assets for review/analysis, publishing, and producing.

Referring more particularly to the drawings, FIG. 1 illustrates an overview of an asset in relation to the intended entities of the invention. Users of the present invention must subscribe for the subscription-based software service. To subscribe, a User provides personal and or company contact information, billing information, creation of a User-id and password (consisting of alpha/numeric characters). A company can choose varying Asset Restriction Levels (which allow the User(s) company to specify levels of permission for accessibility, distribution, copying, saving or printing sensitive assets) for each User.

A universal script management system, according to the present invention, can allow literary assets to flow within a specific User network, or between Users' Networks. To protect proprietary information, the present invention contains Asset Restriction Levels (ARL) (FIG. 18) which provide security and control over literary assets and all related workflow. The ARLs can control access to information, and track usage both within a specific User network or between User's Networks.

According to an aspect of the invention, a User(s) Network can be defined, within the entertainment industry and publishing industry, as that pertaining to an agency, production company, studio, publishing house or an individual User.

According to another aspect of the present invention, an ability to destroy a remote literary asset, based upon one or more predefined business rules, is incorporated. An example of the "destroy remote literary asset" feature is a User can allow 60 days for review of a literary asset by an intended recipient. At the end of 60 days the literary asset dissolves from the recipient's network. Remote asset restrictions are placed on an asset at the time of disbursement.

Users can specify the levels of permission for not only who can access a literary asset (i.e. Writer, Reader, Producer, etc.) and to what extent (i.e. permission levels of Low, Medium, High), but can also be attached to specific workflow, communication, notes, etc. associated with a literary asset. This helps to prevent literary assets and all related workflow from being printed, forwarded, or copied by unauthorized individuals.

Literary assets are uploaded into the software database via PDF (but may also be updated via doc., JPEG., txt., rtf., MPEG, TIFF, GIF, PNG). Assets are uploaded by writers and/or those given the right to distribute an asset (i.e. agent, manager, etc.). Once an asset is uploaded into the database via PDF, it is transitioned into a LitCentral document whereby the integrity of the original asset is protected and cannot be modified.

Figure 3A:
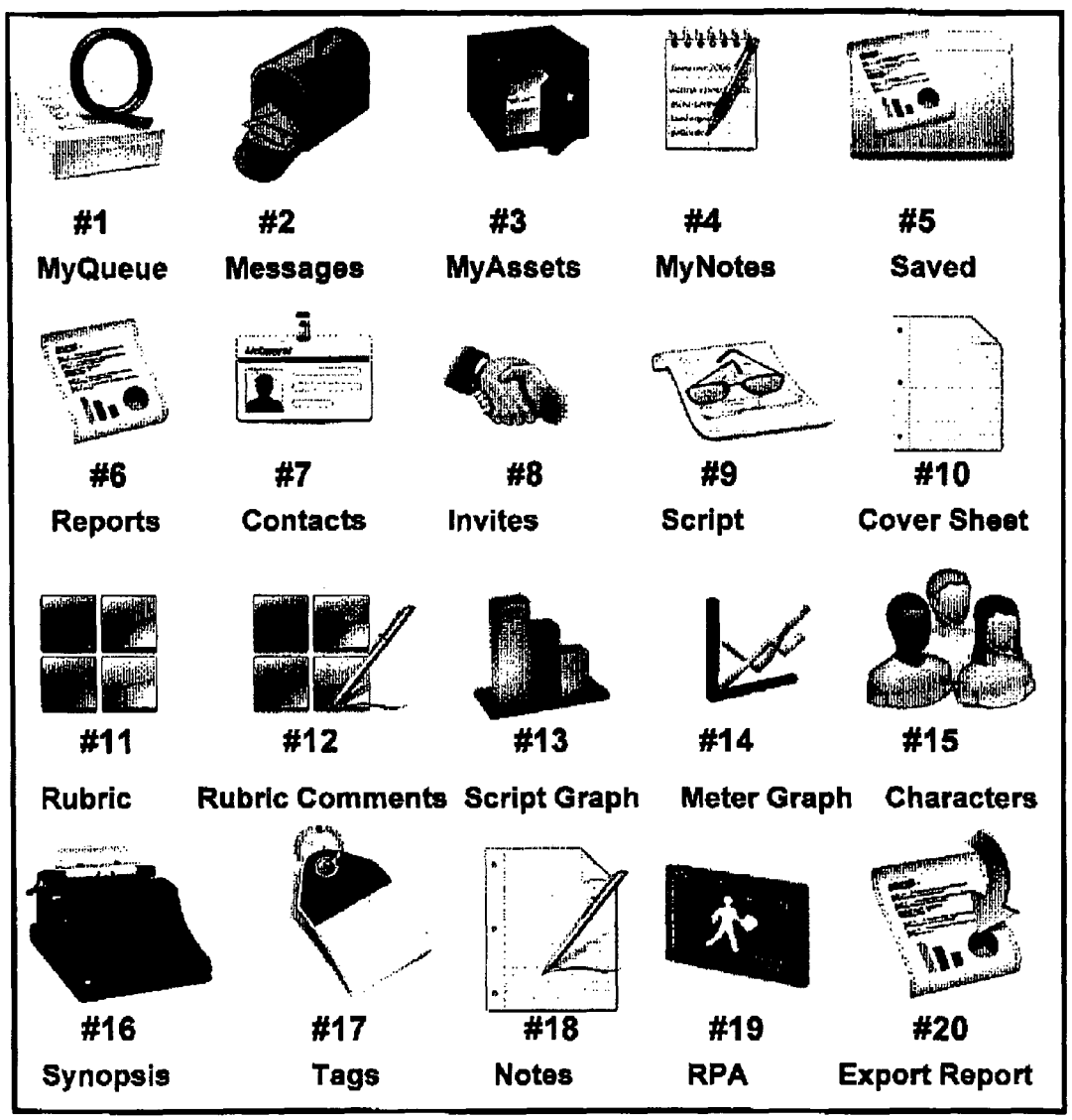
FIG. 3A illustrates graphics associated with said invention.
Figure 3B:
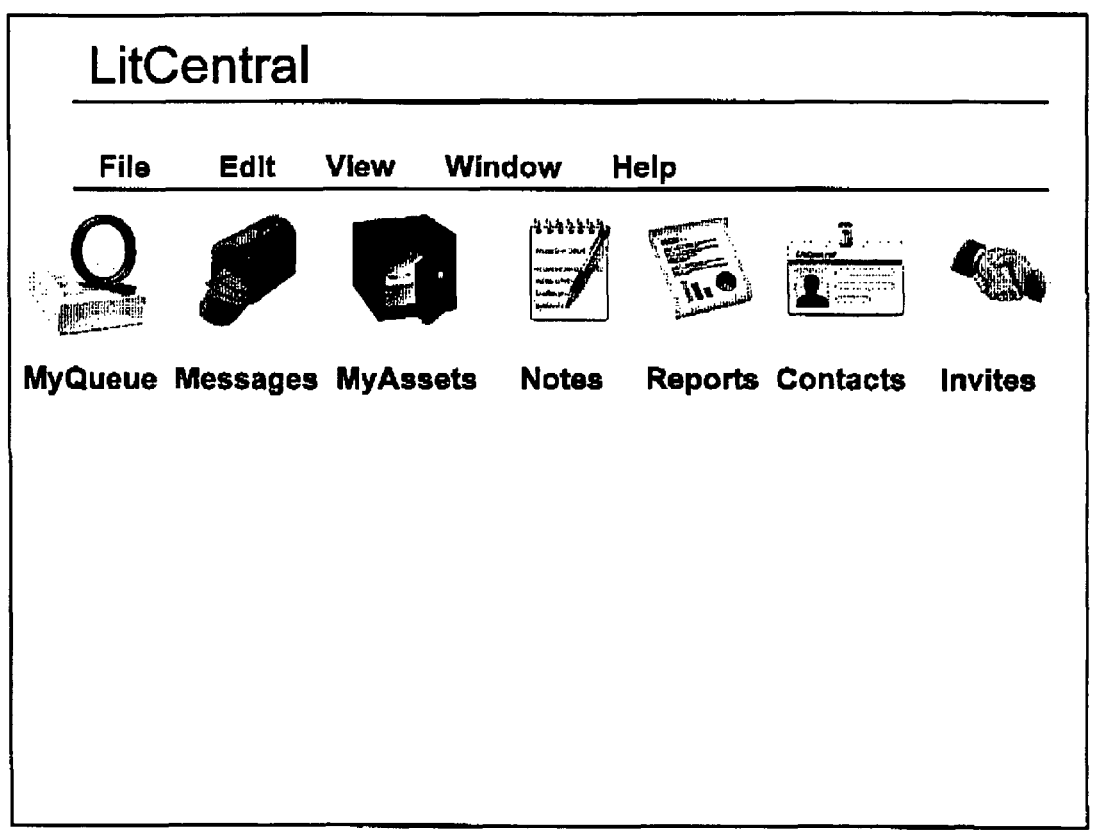
FIG. 3B illustrates the top toolbar menu/features of said invention.

To access the software a User must log-in to the database using their User-id and password. The software is created with top menu areas/functions (FIG. 3A, #1-#8 and FIG. 3B): MyQueue, Messages, MyAssets, MyNotes, Saved, Reports, Contacts, Invites. These top menu areas all allow for the reviewing, sorting, archiving, retrieving, distributing, analyzing, etc. of assets for script management and development. The screen format for all of the above areas consist of three panels—1) a customizable floating vertical Tag/Navigation panel used for analyzing an asset with inking tools for tablet PC Users; 2) a customizable horizontal top panel used to display line items and to act as a text input panel; 3) a customizable horizontal bottom panel which allows for a brief description or full view of an asset.

The MyQueue (FIG. 4) area of the software contains/displays a User's assets and related workflow (messages, notes, reports, etc.). MyQueue acts similar to an email account. To access a specific literary asset, message, report, etc., a User can click on the line item displayed in the queue. A single-click displays a snippet or short description of the item, whereby double-clicking will display the asset, message, etc. in its entirety. Once an asset is displayed in its entirety, varying functions (analyzing, viewing, distributing, annotating, etc.) can be performed (based on User's Asset Restriction Level). The names of the sections within the Header in MyQueue can be customized to include: Asset Title, Date Received, Folder, Asset Type, From, etc. Items within MyQueue can also be sorted by clicking on a Header Name. For example to sort MyQueue by the date the items were received a User can click RECEIVED within the Queue, and the list will sort accordingly. A User can also locate a specific asset or related workflow by the Edit, Find feature on the top gray toolbar (similar to a Word document).

The MyAssets (similar to FIG. 4) area of the software is similar to a personal folder and contains a User's personal assets. To move an asset into the MyAssets folder, a User can right click on the asset and choose "Save to MyAssets," choose the asset and click on File, Save, MyAssets, title of asset, or Drag-and-Drop the asset into MyAssets. The names of the sections within the Header in MyAssets can be customized to include: Asset Title, Date Received, Folder, Asset Type, From, Writer, etc. Items within MyAssets can also be sorted by clicking on a Header Name. For example to sort MyAssets by writer, the User would click WRITER and the list will sort accordingly. A User can also locate a specific asset or related document by the Edit, Find feature on the top gray toolbar (similar to a Word document).

The MyNotes (similar to FIG. 4) area of the software contains any notes made by the User. The MyNotes area of the software can be similar to a notepad and can allow a User to create typed or handwritten notes and either attach them to a specific asset or save them under a chosen title. To attach a Note to an asset, a User would create the note (either by using a digitizer and annotating or using the keyboard and typing). Once the note is created, a User would right click within the note and choose "Attach to (title of asset)," choose the asset and click on File, Save, MyNotes, title of asset, or Drag-and-Drop the asset into MyNotes. The names of the sections within the Header in MyNotes can be customized to include: Asset Title, Creation Date, Folder, Asset Type, From, Writer, etc. Items within MyNotes can also be sorted by clicking on a Header Name. For example to sort MyNotes by Asset Title, the User would click ASSET TITLE and the list will sort accordingly. A User can also locate a specific asset or related workflow by the Edit, Find feature on the top gray toolbar (similar to a Word document).

The Saved (similar to FIG. 4) area of the software contains assets which were "saved" during the analyzing process (sometimes called Coverage, Script Analysis). If a User chooses to quit the program, or no longer wishes to analyze a document, a copy of the analyzed document—at the point of the last change—would automatically be saved. To re-access the "saved" document, a User would go to the Saved menu and double-click on the document. The saved document would re-load and be displayed at the last place a change was made. The names of the sections within the Header in Saved can be customized to include: Asset Title, Creation Date, Folder, Asset Type, From, Writer, etc. Items within Saved can also be sorted by clicking on a Header Name. For example to sort Saved by asset title, the User can click ASSET TITLE and the list will sort accordingly. A User can also locate a specific asset or related workflow by the Edit, Find feature on the top gray toolbar (similar to a Word document).

The Reports (similar to FIG. 4) area of the software contains a User's completed reports (i.e. Coverage, Script Analysis, etc.). To access a Report, a User would double-click on the asset tile and the report would display. The names of the sections within the Header in Reports can be customized to include: Asset Title, Creation Date, Folder, Asset Type, From, Writer, etc. Items within Reports can also be sorted by clicking on a Header Name. For example to sort Reports by the creation date, the User would click CREATION DATE and the list will sort accordingly. A User can also locate a specific asset or related workflow by the Edit, Find feature on the top gray toolbar (similar to a Word document).

The Contacts (similar to FIG. 4) area of the software contains a User's list of contacts. To send a message to a contact, a User would double click on the contact and a message box would appear with the contact's User-id. A User would then type (or annotate) their message and click send. The message would be sent within the software database to the intended recipient. The names of the sections within the Header in Contacts can be customized to include: Name, Company, Contact Type, etc. Contacts can also be sorted by clicking on a Header Name. For example to sort Contacts by a contact's name, the User would click NAME and the list will sort accordingly. A User can also locate a specific contact by the Edit, Find feature on the top gray toolbar (similar to a Word document).

The Invites (similar to FIG. 4) area of the software contains all invites sent by a User. Invites are sent to individuals who are not Users of the software database, but who may have an asset a User wishes to have uploaded. For example, if a User (agent) wants a new writer client to send him a script, he can send an invite to the new writer contact. Assets cannot enter (get uploaded) into the software database by a un-subscribed User without the invite from a subscribed User. The sent invite would be received by the new writer client via email. The email would contain a password, User-id and link to the database. The new writer client would click on the link which would transport them to the database. Here they would input the User-id and password provided (this becomes their temporary User-id which does not require subscribing to the software service—this is one-way communication with the specified User requesting asset). The new writer client would then upload the specified asset into the database along with various meta-data and personal contact information. The uploaded asset receives a tracking identification number, which is attached to all related workflow associated with the asset for as long as the asset remains in the database. Once an asset has been uploaded into the software database by the new writer client, the User can receive an automatic or new-writer-activated electronic notification.

In the entertainment and publishing industries, literary assets are reviewed/assessed by industry professionals (often referred to as Editors, Readers or Reviewers, with varying levels of preferences, skill sets, etc.) to determine the literary asset's value. A typical current process used in reviewing a literary asset is similar, but not limited, to: a) reading the literary asset, b) completing a Word document, matrix, or company form, c) attaching a grade to the asset. The current grade given within the entertainment industry is usually Pass/Consider/Recommend, Poor/Fair/Good, or a combination of both or similar values.

There is currently no universal grading system that accurately, objectively and/or categorically quantifies a Reader's feedback/opinion for literary assets; it is based solely upon a reviewer's interpretation/opinion. Pass/Consider/Recommend and Poor/Fair/Good is an ambiguously flawed grading system because it assumes each User's "poor" or "fair" or "good" is based on the same set of criteria. Inherently, each User has his or her own ideology of "poor," "fair," and "good," and thus a quantified analysis using such can be as inconsistent as each User's personal standards. For example, one User's interpretation when reviewing an asset and giving a score of "consider" may mean "the asset needs some fine-tuning, but the idea is satisfactory" and another User's interpretation and score of "consider" may mean, "the asset needs to be completely rewritten, but the idea is great." Furthermore analysis is limited to the Reader's knowledge of story structure (i.e., skill sets). For example, it is easy to understand the difference in skill sets between a college intern and a 10-year veteran Script Analyst—all of whom covet the position of Reader in the entertainment and/or publishing industry.

To date, a Reader relays his or her subjective feedback based on what he or she believes the literary asset should comprise to warrant the final grade. Because each Reader's knowledge of the elements that comprise story structure can differ greatly there is no standard. Moreover, the current method of offering subjective feedback is communicated in text only, and therefore cannot be averaged or quantified, unlike the present invention's methodology of using a Rubric (defined below) to obtain a more definitive (e.g., numeric or alphanumeric) value. The present invention provides a solution to the problems stated above by providing a standard set of elements, each with its own question and a group of weighted declarative statements producing an overall numeric value called a Rubric Point Average (RPA). This methodology is presented in the form of a Rubric.

The present invention uses a methodology of assessment called a Rubric—a cumulative scoring guide used in the assessment of a literary asset. A Rubric produces a mathematical sum based on a full range of specific criteria. Mathematical sums produce numeric values thereby allowing for quantification based on identifiable and relatively objective criteria. Because the Rubrics set forth specific criteria, define precise requirements for meeting those criteria, and assign numerical scores to each level of performance, they provide an effective, objective method for evaluating assets that do not generally lend themselves to objective assessment methods. The Rubrics also provide a set of standards and expectations for evaluating an asset.

The Rubric of the present invention contains a set of elements which define and describe what the inventors ascribe to be the important components of a literary asset based on story structure (i.e. premise, protagonist, antagonist, climax, etc.), and provide a Reader (e.g., one who critiques) a set of clearly defined criteria on which to express his or her interpretation/feedback on an asset. As presently embodied, each element of the Rubric is followed by a question which is answered by choosing one of four weighted declarative statements (cf. FIG. 19). Each declarative statement is based on a gradation, with a score of 1-4 assigned to each statement, and a clear description of the criteria needed to attain the score at each level. By breaking down the elements of story structure, defining a specific set of criteria (e.g., questions/declarative statements), and attaching weighted values to such criteria, Readers will have a guideline for uncovering and analyzing the value of a literary asset. While Rubrics still allow for some subjectivity, there relative consistency surpass typical, relatively ambiguous methods used today of pass/consider/recommend and poor/fair/good. The beginning part of a Rubric, according to an exemplary implementation, is provided below in grid format:

| 1 | 2 | 3 | 4 |
|---|---|---|---|
| \multicolumn{4}{c}{1. Premise} | | | |
| \multicolumn{4}{c}{Is the premise high-concept or engaging?} | | | |
| The premise is not high-concept nor is it engaging. | The premise may be original or unique but it lacks mass audience appeal. | There is potential for mass audience appeal but the premise is not unique or original. | The premise is high-concept and engaging and offers good potential for mass audience appeal. |
| Comments: | | | |
| \multicolumn{4}{c}{2. Inciting Incidents} | | | |
| \multicolumn{4}{c}{Does the inciting incident grab your attention and occur in a timely manner? If unorthodox} | | | |
| \multicolumn{4}{c}{(e.g., more than one or one of chronological sequence, etc.), does it engage your interest} | | | |
| \multicolumn{4}{c}{and set the story in motion?} | | | |
| The inciting incident does not occur in a timely manner nor does it work within the context of the story. It does not grab my attention nor does it make me want to continue reading. | The inciting incident occurs in a timely manner or works within the context of the story, but it does not grab my attention or make me want to continue reading. | The inciting incident occurs in a timely manner (or works within the context of the story.) In grabs my attention and makes me want to continue reading. | The inciting incident immediately grabbed and held my attention. |
| Comments: | | | |
| \multicolumn{4}{c}{3. Introduction of Protagonist(s)} | | | |
| \multicolumn{4}{c}{Is (are) the protagonist(s) intriguing? Do you empathize with and/or root for the main character(s)?} | | | |
| The protagonist is unoriginal or stereotypical and the reader neither empathizes with nor roots for the main character. | The protagonist isn't unique but the reader can empathize with the goals. | The protagonist is somewhat intriguing and the reader can empathize with and root for certain elements. | The protagonist is intriguing and the reader empathizes with and roots for the main character. |
| Comments: | | | |

The presently preferred implementation consists of 25 elements, although fewer or greater numbers of elements are possible in modified embodiments. According to the current implementation, those 25 elements, and the corresponding questions, within the Rubric, by which a Reader would grade against, are:

Premise—Is the premise high-concept or engaging?.

Inciting Incident—Does the inciting incident grab your attention and occur in a timely manner? If unorthodox (e.g., more than one or out of chronological sequence, etc.), does it engage your interest and set the story in motion?

Protagonist—Is (are) the protagonist(s) intriguing? Do you empathize with and/or root for the main character(s)?

Antagonist—Is the antagonist unique and interesting? Does he/she serve as a direct threat or pose a significant obstacle to the protagonist?

Supporting Characters—Are the supporting characters distinctive? Do they each serve a unique and relevant purpose in the story? Do the supporting characters add flavor and color to the story?

Plot—Are the stakes high enough? Do you have a good sense of where the story is going? Are you intrigued by the potential endings?

Tone—Is the tone clear and consistent? Is it appropriate to the story?

Theme—Is the theme clear? Is the theme communicated through the character arc?

Plot Point I—Does the first turning point take us in an entirely new direction?

Conflict—Is there sufficient conflict between the protagonist and the antagonist? Does the storytelling further develop the protagonist's internal and external conflicts?

Twists—Are there interesting reversals or intriguing complications throughout?

Pacing—Does the pacing escalate at a sufficient rate?

Mid-Point—Is the mid-point clearly defined? Is it structurally effective?

Subplots—Do the subplots complicate the plot and layer depth to the theme?

Are the subplots interesting and well integrated? Do they add to the momentum of the story or enhance its theme?

Plot Point II—Does the second turning point drive the story towards the climax?

Climax—Is every element in the story caught up in the momentum towards the climax? Is the climax satisfying?

Character Arc—Does the protagonist experience a transformational arc? Are his or her internal and external motivations fulfilled?

Resolution—Have all the subplots been resolved? Have all the setups been paid off? Has the theme been adequately explored?

Dialogue—Is the dialogue fresh or appropriate to the time period/setting? Does each character have a distinctive speech pattern and vocabulary?

Character Development—Does this writer have a command of character development?

Writer's Voice—Does this writer have a fresh and original voice?,

Title—Rate the effectiveness of this title.

Marketability—Is this material and or writer's style marketable?

Format—Is the material written in proper format?

Story Credibility—Given the story's setting, time period, circumstances, genre, etc., is the story believable?

The Rubric for the present invention also produces a multicolored bar graph. The bar graph consists of the same elements as the Rubric. As elements within the Rubric are ranked, the corresponding element within the bar graph will mirror that numeric score. The bar graph is a visual interpretation of the Rubric and gives a User a birds-eye view of the overall strengths and weaknesses of the literary asset (based on the scoring of the Rubric). For example, if the element, Antagonist ranked a 3 on the Rubric, the Antagonist element on the bar graph would also depict a ranking of 3.

In essence a Rubric is used to obtain the opinion/subjective feedback of a Reader and attach a weighted numeric value (based on a pre-determined set of criteria) to subjective feedback, thereby turning the subjective feedback into quantifiable data which can be measured, averaged, sorted, etc. Within the present invention is the ability to average the numeric values (the opinions/subjective feedback bases on specific criteria) of many, using the Rubric interface, which produces an average numeric value for a literary asset. Therefore the value of the literary asset can either be based on one quantified opinion or the quantified opinions of many.

Figure 6B:
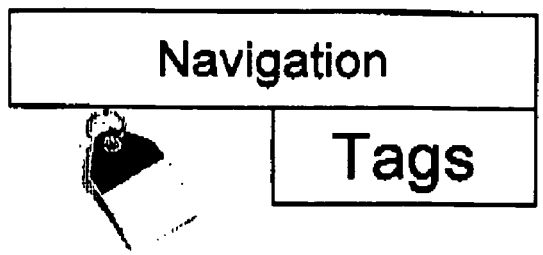
FIG. 6 illustrates the floating Tag/Navigation panel (navigation)

FIG. 2 illustrates a flow chart of analyzing an asset in accordance with the present invention. To analyze an asset, a User can first log into the database. Using the File, Edit, View, Window, Help functions on the gray toolbar, located above the top toolbar, the User can select File, Start Coverage (FIG. 5) choosing the Asset Name (title of the asset), Coverage Type (type of analysis) and making any desired notes. The asset can appear in text format on the right side of the screen, with a floating Tag/Navigation toolbar (FIG. 6a (tags), FIG. 6b (navigation)) used for analyzing an asset while it is being read. Auto scroll features (which allow for reading without manually scrolling) are also activated.

During the reviewing/analyzing process, the User is creating a report that can be exported, saved, printed (ARLs apply). The following can be included on the report: Cover Sheet, Rubric, Rubric Comments, Synopsis, Tag Report, Note Report, Character Breakdown, RPA, Script Graph and Meter Graph. Once a report has been completed and Exported, it cannot be changed.

During the reviewing/analyzing process, it may be necessary to view an asset in its entirety. Clicking on the Script (FIG. 3A, #9) feature on the Tag/Navigation toolbar will display the entire asset.

Clicking on the Cover Sheet (FIG. 3A, #10 and FIG. 7) feature on the floating Tag/Navigation toolbar will display the Cover Sheet associated with the asset. When an asset is uploaded into the software database, various meta-data information is included (i.e. asset title, writer, genre, pages, etc.) producing a Cover Sheet. This meta-data is used for identification and for sorting. For example, if a User is looking for assets within the genre of "Westerns," the assets can be located if meta-data was included upon upload. There is some information within the Cover Sheet which cannot be included upon upload (i.e. Script Evaluation, Submitted to, etc.). A User has the ability to add and/or edit information on the Cover Sheet.

Clicking on the Rubric (FIG. 3A, #11 and FIG. 8) activates the grading mechanism, in grid format, which also produces a corresponding graph and numeric value or Rubric Point Average (RPA). The grading mechanism is based on elements, with each element being followed by a question pertaining to the element. The User chooses one of four declarative statements or responses to the question within each element. Each declarative statement corresponds to a weighted numeric value anywhere from 0 to 4.0. Each weighted declarative statement is placed within a square shape and has a numeric value attached. The numeric values are either 1, 2, 3, 4 with 1 giving the lowest score and 4 giving the highest score. When a User hovers the mouse, digitizer over the answer, the square will highlight to a correlating pale shade of color 1—red, 2—yellow, 3—light green, 4—green (same as in the company logo). When a User selects the answer using a mouse or digitizer, the square will change to a correlating darker shade of the above color.

Once the Rubric has been completed, an overall numeric value for the literary asset has been created. For example, a User analyzing/reviewing the script "Gone with the Wind," would first read the script (within the software database). While reading the script, the User is tagging (using the Tag/Navigation panel) various dialogue and making notes and comments about the script. Once the script has been read, a User would click on Rubric (on the Tag/Navigation panel). The Rubric will list a series of 25 elements each with a question and corresponding declarative statements. The User would select an answer to each question and can make comments in the comment section below the element. While the Rubric is being completed a numeric value or Rubric Point Average is being calculated. Once the Rubric has been completed in its entirety, the final RPA has been calculated and all comments have been made. A quantified value has now been placed on the literary asset. Also, within the software database is the ability to average the numeric values (in essence the opinions/subjective feedback) of many, which produces an average numeric value or RPA for a literary asset.

Clicking on Rubric Comments (FIG. 3A, #12 and FIG. 9) generates a report that contains all comments made while analyzing a script using the Rubric. The final score/rank is displayed on the Rubric Comments page in X.X format. The Rubric Point Average (RPA) is derived from adding all weighted declarative statements, and dividing by the total number of elements. If a User does not want to make comments on any of the elements within the Rubric, the comments section is left blank. This is often referred to Quick Coverage or Quick Analysis since it only produces the overall numeric value of the asset.

Figure 10:
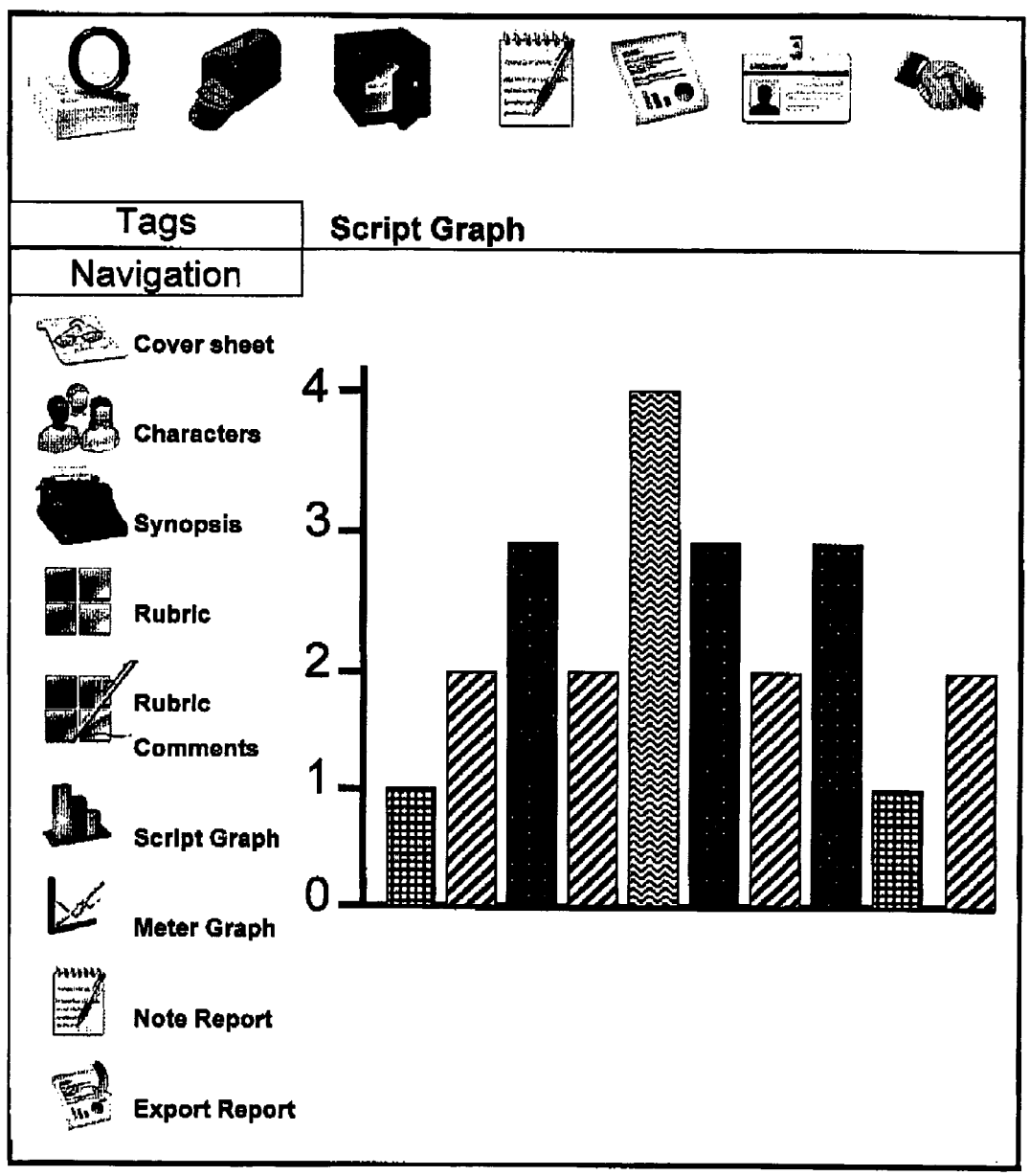
FIG. 10 illustrates the Script Graph.

Clicking on the Script Graph (FIG. 3A, #13 and FIG. 10) displays a graph that is created from the scored elements. The elements on the Script Graph correspond to the elements on the Rubric, and depict the score/rank of the corresponding Rubric element(s). The graph bars vary in color, and the total numeric value of the scored element is displayed. The graph bars are interactive. By clicking on any of the graph bar elements, a User is transported back to that specific element within the Rubric. For example, if a User wants to view the scoring/grading associated with the element, Premise, a user would click on Premise within the Script Graph, and the Premise section of the Rubric would be displayed.

Figure 11:
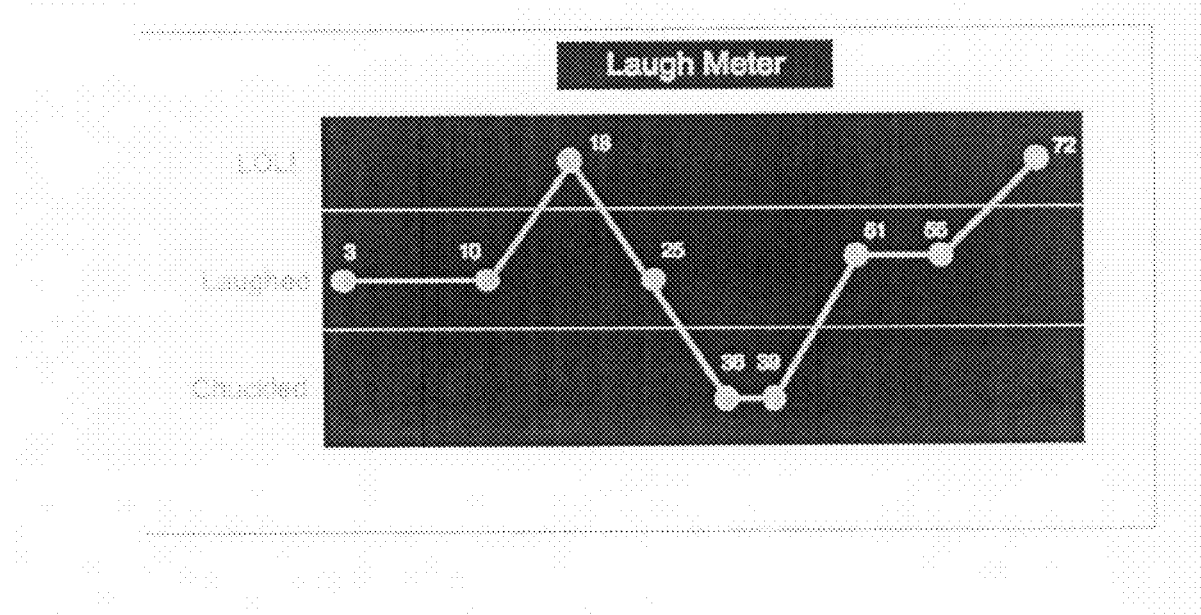
FIG. 11 illustrates the Meter Graph.

Clicking on the Meter Graph (FIG. 3A, #14 and FIG. 11) provides a depiction of the results of the meter tagging performed during the analyzing of an asset. For example, during the analysis of an asset, a User is tagging various dialogue (dialogue can be defined as one word, many paragraphs, full scenes) within the asset using the tagging feature on the floating Tag/Navigation panel. Certain "tags" are represented on graphs called Meter Graphs. For example, if a User tagged a certain scene within the asset "funny," a tag for "funny" would be placed on the meter graph (the tags associated with meter graphs are also depicted on the final Tag Report). There are four meter graphs—laugh meter, action meter, scare meter, and a combination of any two or three meters. Each meter graph displays three levels of emotion related to the specific meter (i.e. Laugh Meter will have—LOL, Laughed, Chuckled). A gray dot, with a corresponding page number, is placed next to the level of emotion on each graph where the dialogue was tagged. For example, if a certain word on Page 1 was tagged "chuckled," the Meter Graph would display a gray dot with a number 1, next to the word Chuckled on the Meter Graph. By clicking on any of the gray dots on the Meter Graph(s), a User is transported back to that specific tagged dialogue within the asset. The meters are displayed in line graph format with the option to change the display to bar or pie graph format.

Clicking on the Characters (FIG. 3A, #15 and FIG. 12) compiles a list of the characters tagged/marked by the User while analyzing an asset. While analyzing an asset it is customary to list the various characters and their descriptions. Currently, anyone analyzing an asset would manually input the characters and their descriptions on a Word document. The present invention allows for Users to highlight various characters and their descriptions (i.e. characters in a screenplay). This is called Character Breakdown. Characters are usually broken down into two categories—Main and Extra. A main Character and its description(s) can be edited or deleted, and can be selected by highlighting the character and its description. Extra Characters do not have descriptions, and are selected by right clicking on the highlighted character name (i.e. Doctor, Presenter), and can be edited or deleted from the final report. Extra Characters can be sorted by name, page number, etc.) The Character Breakdown is compiled, along with the tagging, comments, notes, RPA, etc., and will be displayed in the final report (often called Coverage Report, Script Analysis).

Clicking on the Synopsis (FIG. 3A, #16 and FIG. 13) allows a User to create (by typing or writing) a synopsis for an asset. A synopsis is a summary of the asset and is standard in the current method used today within the industries. The synopsis can be edited using standard editing features (similar to Microsoft Word).

Clicking on the Tag Report (FIG. 3A, #17 and FIG. 14) depicts items tagged during the analyzing of an asset. Tags are located on a floating Tag/Navigation toolbar. Tags can be customized (depending upon software edition), but the present invention includes 20+ pre-determined tags. Tags are used to describe text, dialogue, asset structure, etc., and assist in the analyzing and assessment of an asset. Examples of tags are: Needs Work, Strengths, Weaknesses, Suggestion, Back Story, Structure, Formatting, Narration, Writing Style, etc. You can add notes to tagged items. To Tag an item, specific text, dialogue or a scene is highlighted and a tag is chosen from the Tag/Navigation panel. Tagging dialogue during the analysis of an asset will produce a Tag Report. Tags on the Tag Report can be sorted, edited, and/or deleted at any time before the Tag Report is Exported. The Tag Report consists of a snippet of the highlighted text/dialogue/scene in proper asset format (i.e. manuscript, screenplay, etc.), along with a page number and the tag name. Tags on the Tag Report are interactive. For example, a User can click on a specific tag on the Tag Report and is transported to that specifically highlighted section of the asset.

Clicking on Note Report (FIG. 3A, #18 and FIG. 15) illustrates notes made about various text, dialogue, scenes, etc. of an asset. Notes can be associated with tags or stand alone. Notes on the Note Report can be sorted, edited, and/or deleted.

Figure 16:
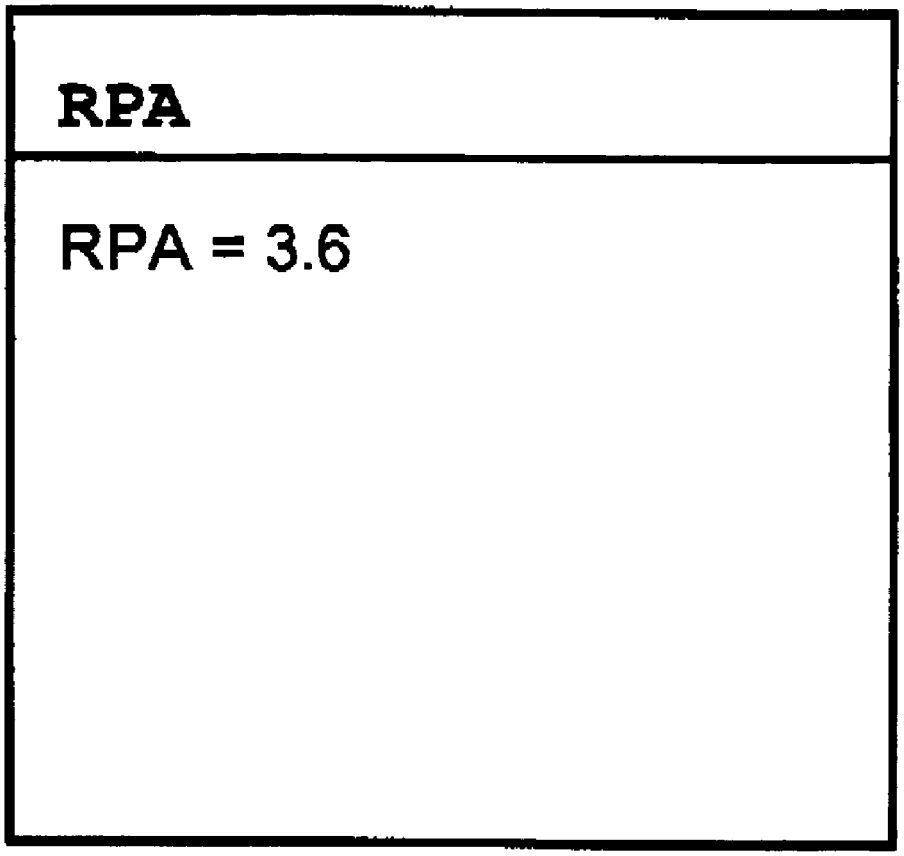
FIG. 16 illustrates the RPA.

Clicking on the RPA (FIG. 3A, #19 and FIG. 16) illustrates the results of the completed Rubric. The RPA (Rubric Point Average=the grade or rank giving to an asset, based upon the scoring of the elements on the Rubric) is calculated as the Rubric is being completed, and each element of the asset is being graded. The lowest possible RPA is 0.0 and the highest is 4.0

Clicking on the Export Report (FIG. 3A, #20 and FIG. 17) allows a User to choose which sections of the Report (i.e. Coverage, Quick Coverage, Script Analysis, Development Notes) that the User would like to Export (send, print or save). Asset Restriction Levels apply. Once a Report has been Exported the content cannot be changed or modified. Reports can consists of the Cover Sheet, Character Breakdown, Synopsis, Script Graph, Meter Graph, Rubric Comments, Tag Report, Notes Report or all of the above (Full Report).

In view of the foregoing, it will be understood by those skilled in the art that the methods of the present invention can facilitate formation of workflow management systems and asset development. The above-described embodiments have been provided by way of example, and the present invention is not limited to these examples. Multiple variations and modification to the disclosed embodiments will occur, to the extent not mutually exclusive, to those skilled in the art upon consideration of the foregoing description. Additionally, other combinations, omissions, substitutions and modifications will be apparent to the skilled artisan in view of the disclosure herein. As iterated above, any feature or combination of features described and referenced herein are included within the scope of the present invention provided that the features included in any such combination are not mutually inconsistent as will be apparent from the context, this specification, and the knowledge of one of ordinary skill in the art. For example, any of the components, and any particulars or features thereof, or other features, including method steps and techniques, may be used with any other structure and process described or referenced herein, in whole or in part, in any combination or permutation. Accordingly, the present invention is not intended to be limited by the disclosed embodiments, but is to be defined by reference to the appended claims.

We claim:

1. A computer method in a document management system for analyzing, critiquing and quantifying literary documents (i.e. screenplays, stage plays and manuscripts), comprising:
   using declarative statements in order to objectify feedback;
   applying a numeric value to each declarative statement in order to objectify feedback;
   producing an overall grade by using a running calculation of each element within the scoring system;
   merging the quantified opinion of multiple users;
   providing a standard set of criteria on which to form a fundamental basis for agreement;
   applying emotion-descriptive tags to selected text for the purposes of tracking a reviewer's emotional response;
   calculating each emotion-descriptive tag to quantify the reviewer's overall emotional response;
   tagging selected text with frequent words/comments;
   choosing selected text for comments and feedback;

creating a detailed computerized document, in the form of a report that can be printed, collaborated and distributed electronically; and compiling quantified feedback for tracking trends, searching, archiving and enhancing the system database.

2. A computer system in a document management system for analyzing, critiquing and quantifying literary documents (i.e. screenplays, stage plays and manuscripts), comprising:

using declarative statements in order to objectify feedback;

applying a numeric value to each declarative statement in order to objectify feedback;

producing an overall grade by using a running calculation of each element within the scoring system;

merging the quantified opinion of multiple users;

providing a standard set of criteria on which to form a fundamental basis for agreement;

applying emotion-descriptive tags to selected text for the purposes of tracking a reviewer's emotional response;

calculating each emotion-descriptive tag to quantify the reviewer's overall emotional response;

tagging selected text with frequent words/comments;

choosing selected text for comments and feedback;

creating a detailed computerized document, in the form of a report that can be printed, collaborated and distributed electronically; and compiling quantified feedback for tracking trends, searching, archiving and enhancing the system database.

\* \* \* \* \*